Figure 1:
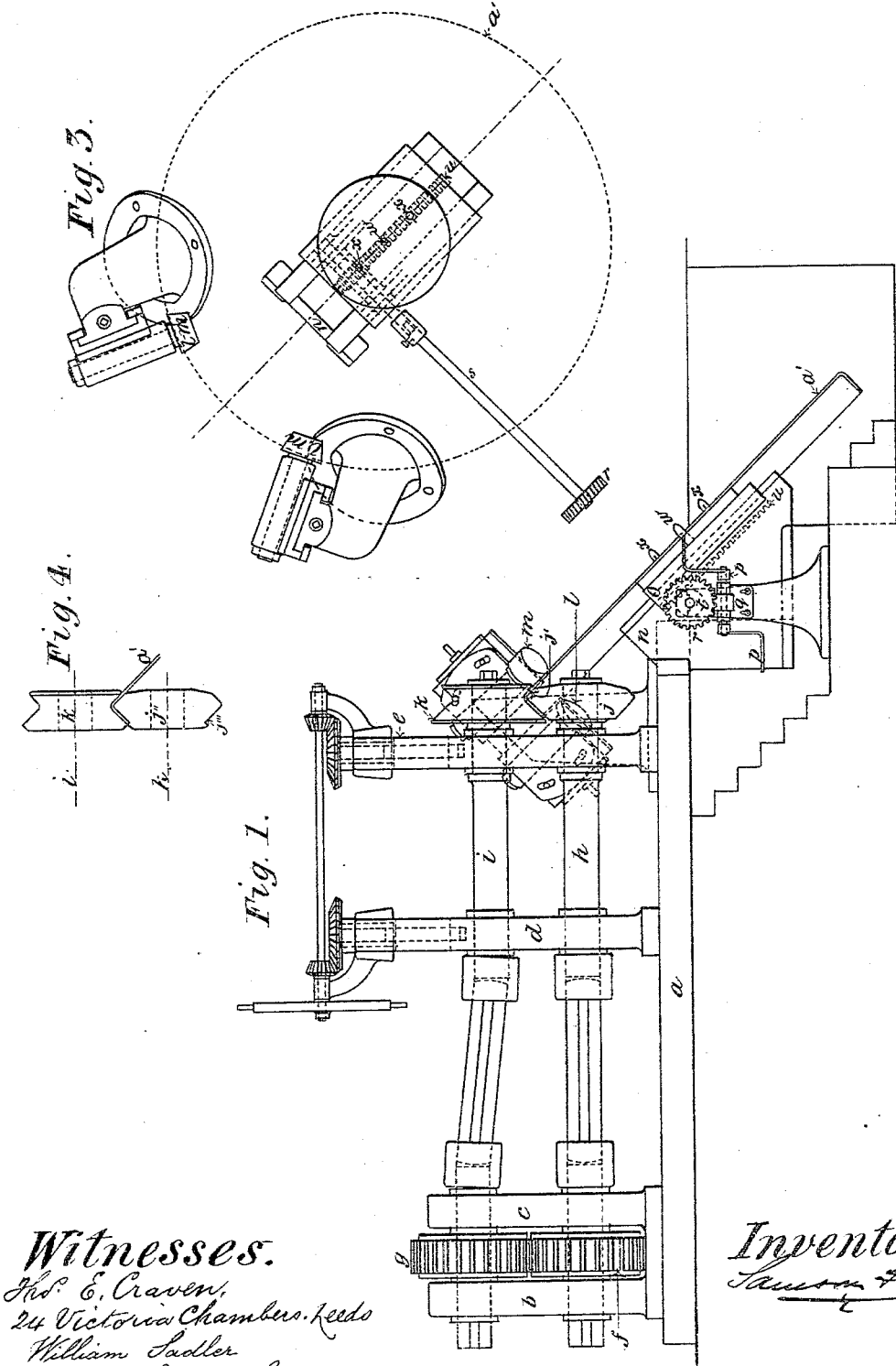

(No Model.) 2 Sheets—Sheet 2.

S. FOX.
FLANGING MACHINE.

No. 318,889. Patented May 26, 1885.

Witnesses.
Thos. C. Craven
24 Victoria Chambers, Leeds.
William Sadler
North Street Leeds Inventor.
Samson Fox

UNITED STATES PATENT OFFICE.

SAMSON FOX, OF HARROGATE, COUNTY OF YORK, ENGLAND.

FLANGING-MACHINE.

SPECIFICATION forming part of Letters Patent No. 318,889, dated May 26, 1885.

Application filed March 12, 1884. (No model.) Patented in England September 3, 1883, No. 4,229, and in France February 22, 1884, No. 160,514.

*To all whom it may concern:*

Be it known that I, SAMSON FOX, a subject of the Queen of Great Britain and Ireland, residing at Harrogate, in the county of York, Kingdom of Great Britain and Ireland, have invented new and useful Improvements in Machinery or Apparatus for the Manufacture of Certain Parts of Steam-Boilers and other similar Structures, (for which I have obtained a patent in Great Britain, No. 4,229, bearing date September 3, 1883,) of which the following is a specification.

My invention of improvements in machinery or apparatus for the manufacture of certain parts of steam-boilers and other similar structures relates to means for flanging the end plates of steam-boilers, whether such end plates are in one piece or in sections, and also bottoms or covers of pans or cisterns and other like articles. For this purpose I provide a pair of suitably-shaped rolls mounted in housings resembling those of an ordinary rolling-mill, but in suchwise that the rolls occupy an overhanging position in relation to one of the housings. The peripheries of the rolls are so formed that one shall work within a groove in the other, the space between them, as seen in a central cross-sectional view of the two rolls, being of V form, or approximately so. These rolls are suitably driven in either direction, as may be required, one being in a fixed or constant position, and the other provided with means whereby it can be caused to approach or recede from the other.

In order that a plate when heated all around its edge may be properly placed in position for being operated upon by the above-described rolls, I provide in front of them a suitable bed having a movable slide thereon. This slide is furnished with a projecting pin, or its equivalent, to serve as an axis or center of motion for the plate to be operated upon, which for this purpose is perforated with a central hole for the passage of the pin, or a special plate may be provided capable of turning about a suitable axis or center, and on which the plate to be flanged shall be secured. When the plate to be operated upon is in position, its under surface coincides with and rests upon one of the beveled sides of the angular periphery of the male V-roll, which determines the form of the internal angle of the plate when flanged. Means are provided for adjusting the position of the plate radially and in relation to the rolls, so as to give the required finished diameter to the plate when flanged. The movable or female V-roll is caused to press upon the plate and to turn over that part which is to form the flange, and which projects beyond the periphery of the male V-roll over the edge thereof, so that as the two rolls rotate with the plate between them it is caused to rotate about its own axis on the movable slide, on which it is mounted, and is thus by the rolls turned over or flanged all around at one operation. Plates of other than circular or segmental form may be flanged by my improved machinery or apparatus by regulating the movement of said movable slide (upon which such plate for the time being is mounted) either by hand or by the action of a suitable "form" or "cam," corresponding with the configuration of the plate under treatment.

In addition to turning over the flange, as above referred to, I sometimes form the male V-roll so as to act on and straighten or finish the edge of the newly turned-over flange ready for use.

In some cases I provide additional rolls for straightening or finishing the edge of the flange. These additional rolls are arranged as close as practicable to the before-mentioned V-rolls, and are mounted in slides upon standards in suchwise that a plate on rotating shall pass between them. These rolls are made adjustable on their respective slides or standards, so that one of a pair shall act on and straighten or finish the edge of the newly-formed flange, while the other acts on the plain side, and supports or backs up the plate.

Figure 2:
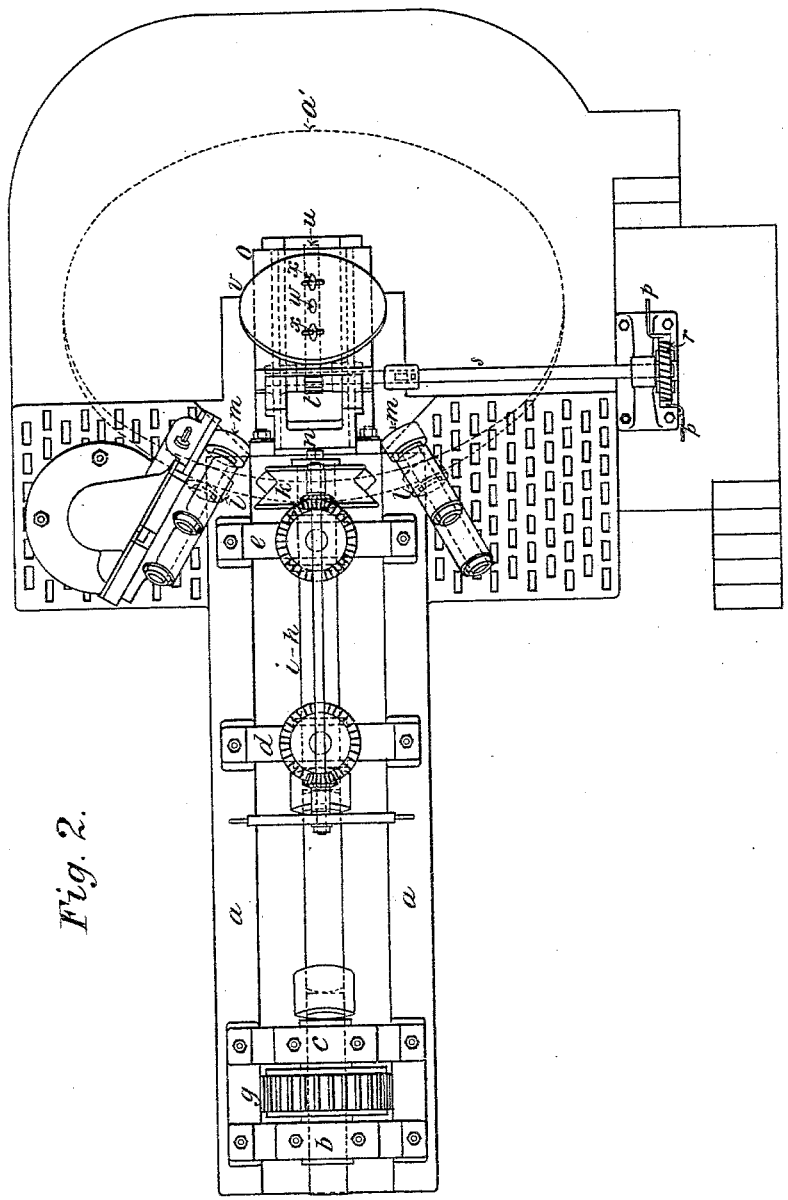

Referring to the accompanying drawings, wherein the same reference-letters are used to denote like parts wherever they occur, Figure 1 is a general elevation, and Fig. 2 is a general plan, of a flanging-machine or apparatus according to my invention. Fig. 3 is a partial plan represented at an angle of forty-five degrees with the axes of the main or flanging rolls, and also shows the additional rolls for straightening or finishing the edge of the newly turned-over flange. Fig. 4 is an elevation showing a modification of main rolls.

a is the bed carrying the housings b and c and d and e. The housings b and c are for the connecting-pinions f and g, that impart motion to the male and female V or flanging rolls j and k, while d and e are for carrying the axes h and i of these V or flanging rolls j k. The lower or male V-roll occupies a constant position with its beveled side or edge j' coinciding with the under side of the plate a' when placed in position for being operated upon, the upper or female roll being raised for admitting said plate in position between said rolls. The said upper roll is next lowered, and presses that part of the plate which overhangs the periphery of the male V-roll j, thus turning over such part and commencing the flanging operation, after which the rolls, which are fitted with a reversing movement, are caused to revolve, and by their action to rotate the plate about its center of motion (hereinafter referred to) during which the turning over or flanging process is continued.

l and m are the additional rolls previously mentioned, placed in close proximity to the flanging-rolls j k, and between which the newly-flanged plate passes, the roll or rolls l pressing on and smoothing or finishing the edge of the flange. The roll or rolls m in the meantime presses on the plain side of the plate and counteracts (or backs up the plate against) the pressure of the roll or rolls l.

n is a bed placed in front of the flanging-rolls, the face of which is at an angle of forty-five degrees with the axes of the flanging-rolls j k. On this bed is mounted a movable slide, o, actuated by winch-handles p p, or otherwise, the worm q, worm-wheel r, shaft s, and rack-pinion t taking it into a rack, u, attached to the slide o. Other equivalent mechanism may be used for this movement.

The slide o carries a revolving table, v, having its center of motion on the pin w, which projects on the upper surface of said table, and on which (being previously pierced at its center) the plate under treatment is mounted. The plate is also pierced in other places for admitting pins or bolts, such as x x, which are provided with cotters or other convenient devices for quickly securing said plate to the table v previous to commencing the flanging process.

Fig. 4 shows in elevation flanging-rolls j'' and k', the roll j'' being formed with a projection, j''', by which the edge of the flange is finished at the time of its formation, in which case the additional rolls l m, above referred to, may be dispensed with.

As previously referred to, other forms than circular may be flanged by the above-described apparatus by subjecting the movement of the slide o to the government of a suitable form or cam. This, however, is not shown in the drawings.

Having described my invention, I claim—

1. In a machine for flanging end plates of steam-boilers and similar articles, the combination of a pair of overhanging rolls, j k, one of which is provided in its periphery with a V-groove and the other provided with a double bevel, arranged as described, so that the periphery of the latter will run in the groove of the former one, with an adjustable support, such as n, placed at an angle of forty-five degrees to the axes of said rolls, whereby a plate carried by said adjustable support may be flanged, in the manner and for the purpose hereinabove described.

2. In a machine for flanging end plates of steam-boilers and similar articles, the combination of a pair of overhanging rolls, j k, the latter provided with a V-groove in its periphery and the former provided with a double bevel and a projection, j''', with an adjustable support, such as n, placed at an angle of forty-five degrees to the axes of said rolls, whereby a plate carried on said support to the rolls is flanged and the edge of the flange is finished at one operation, substantially as described.

3. In a machine for flanging end plates of steam-boilers and similar articles, the combination of flanging-rolls j k and finishing-rolls l m, for finishing the edge of the newly-formed flange, substantially as described and illustrated.

4. The improved machine for flanging end plates of steam-boilers and similar articles, comprising flanging-rolls j k, means for driving the same, finishing-rolls l m, a slide-bed, n, with slide o, means for adjusting the same, and a table, v, to receive and support a plate to be flanged, the whole constructed, arranged, and operating as hereinabove described and illustrated.

SAMSON FOX.

Witnesses:
    THOS. E. CRAVEN,
*Fellow Inst. Patent Agents, 24 Victoria Chambers, Leeds.*
    WILLIAM SADLER,
*North Street, Leeds.*